United States Patent [19]

Rhonehouse

[11] 4,297,121
[45] Oct. 27, 1981

[54] GLASS TEMPERING FURNACES AND SYSTEMS

[75] Inventor: Donald E. Rhonehouse, Cecil, Ohio

[73] Assignee: TGS Systems, Inc., Antwerp, Ohio

[21] Appl. No.: 43,357

[22] Filed: May 29, 1979

[51] Int. Cl.³ ............................................. C03B 27/00
[52] U.S. Cl. ........................................ 65/348; 65/273; 65/350; 65/351; 198/790
[58] Field of Search ................. 65/273, 348, 349, 350, 65/351, 114; 198/790

[56] References Cited

U.S. PATENT DOCUMENTS

| | | | |
|---|---|---|---|
| 2,348,887 | 5/1944 | Drake | 65/273 X |
| 2,528,865 | 11/1950 | Dale | 198/790 |
| 3,344,903 | 10/1967 | Holm | 198/790 |
| 3,806,331 | 4/1974 | Bezombes | 65/351 |
| 3,994,711 | 11/1976 | McMaster | 65/349 X |
| 4,133,667 | 1/1979 | Nitschke | 65/348 X |
| 4,167,997 | 9/1979 | Revells | 65/273 X |

*Primary Examiner*—Arthur D. Kellogg
*Attorney, Agent, or Firm*—Irving M. Weiner; Pamela S. Burt; John L. Shortley

[57] ABSTRACT

A roller hearth glass tempering furnace having a roller track supporting the endless conveyor drive belts, and adjustable locators for conveyor roller spacing. The heating zone size conforms substantially to the size of the glass article being treated. The glass part is reciprocated approximately five inches or less in either direction while being heated or cooled. Fully adjustable roller and drive belt support systems control the horizontal plane of the track and thus maintain a more level conveyor bed. A unitized zone construction allows for future increase or decrease in product output, simply by installation of one or more heating zones and lengthening of drive belts. A wear-resistant, disposable Teflon and/or silicone axle can be used. The furnace incorporates soft, heat-resistant fabric belts which are Teflon and/or silicone rubber coated.

20 Claims, 24 Drawing Figures

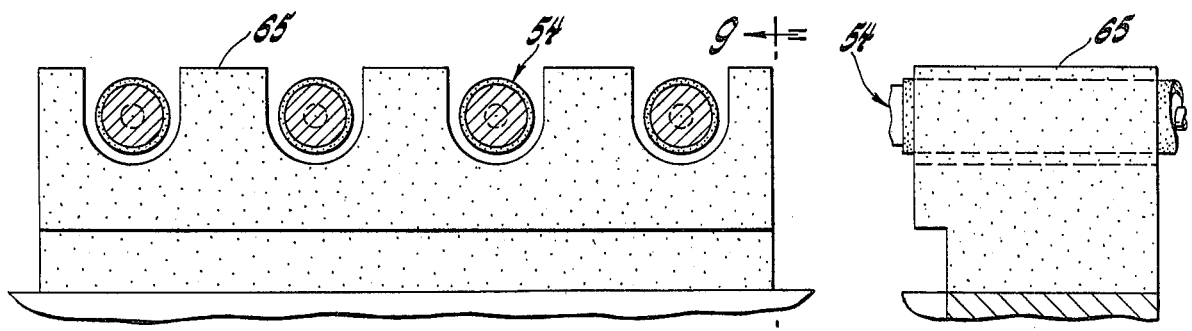
FIG.8  FIG.9
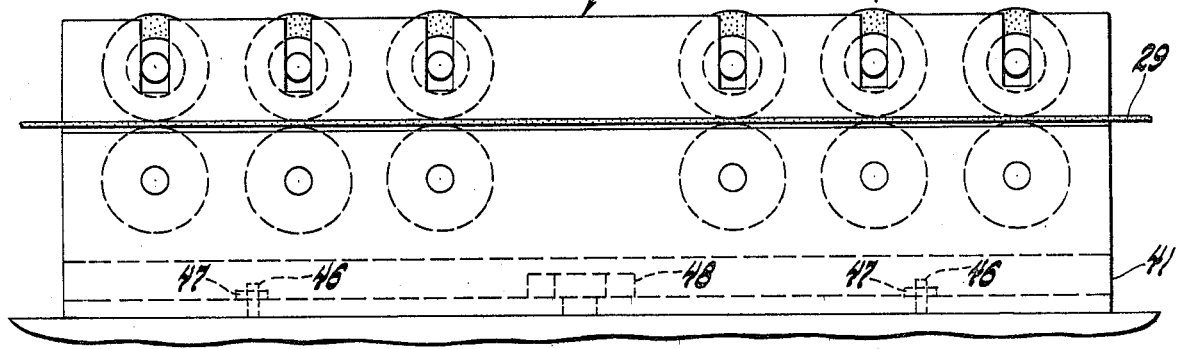
FIG.10
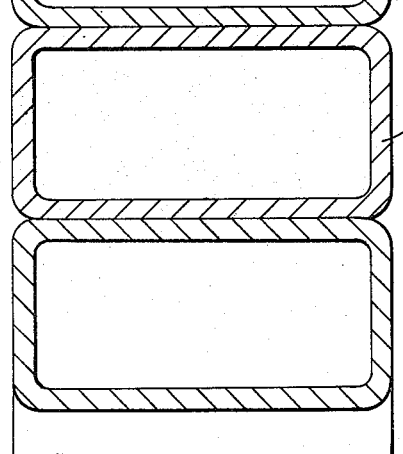
FIG.11
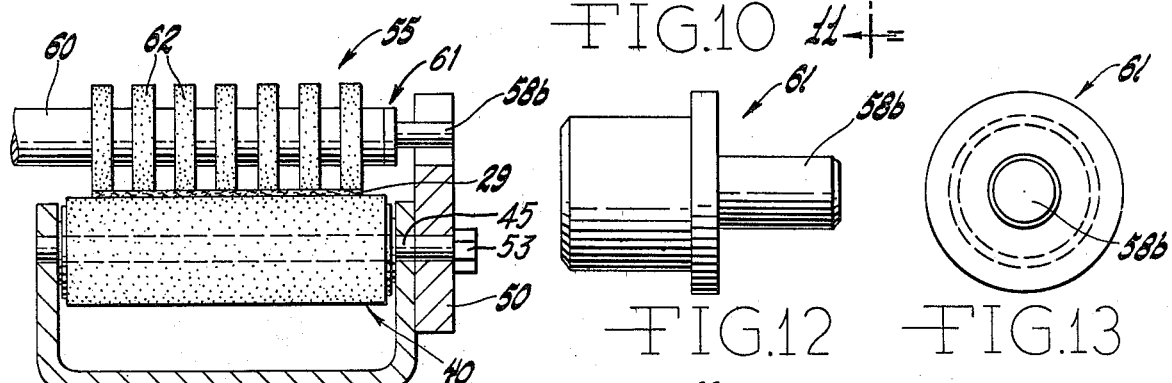
FIG.12  FIG.13
FIG.14  FIG.15
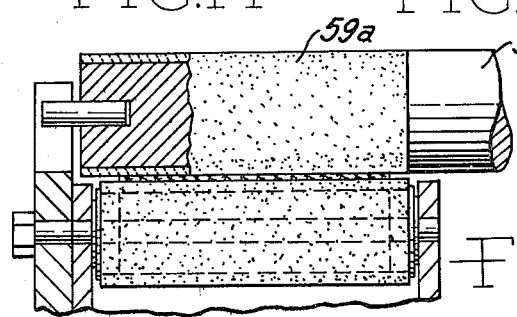
FIG.4a

GLASS TEMPERING FURNACES AND SYSTEMS

The present invention relates generally to glass tempering systems, novel sections and components thereof, and novel methods of constructing and utilizing the foregoing.

BACKGROUND OF THE INVENTION

The purpose of annealing glass is to remove internal stresses that might cause later breakage. Stresses are likely to be present because of unequal temperature distribution in the glass article while it is being made. Glass that has not been annealed may shatter from tension caused by uneven cooling. Annealing is done by reheating the glass and then gradually cooling it according to a planned time-and-temperature schedule.

A somewhat related treatment, is the process of tempering glass. Tempering is a process in which a glass article that is already formed is reheated until almost soft. Then, under carefully controlled conditions, it is chilled suddenly by blasts of cold air, or alternatively by plunging it in oil or certain chemicals in a liquid state. This treatment makes the glass much stronger than ordinary glass. Glass which has been tempered may be up to five times as hard as ordinary glass.

Glass articles may be annealed or tempered by placing them on a metal belt which travels slowly through a heated enclosure called a lehr. Many lehrs measure four to eight feet wide inside and sixty to one hundred feet long. With previous equipment, thin articles could be annealed or tempered in thirty minutes or less.

Flat glass is used primarily for windows, but also finds uses in mirrors, room dividers, and many types of furniture. All flat glass is made in the form of flat sheets. However, some of it, such as that used in automobile windshields, is reheated and curved or sagged over molds. Flat glass can be classified as sheet glass, plate glass, and float glass.

Sheet glass is used in windows in most stores and offices. Plate glass and float glass are used where exceptionally clear and accurate vision is needed, as in automobile windshields and display windows. Sheet glass is taken from the melting furnace with a fire-polished surface and is given no additional treatment. Plate glass is sheet glass that has been carefully ground and polished to smooth the surface. Float glass is made by floating a ribbon of glass on the surface of molten metal instead of going through rollers and being ground and polished. This produces smoother, and more perfectly parallel surfaces. Both sides of the glass come out with a brilliant fire-polished finish.

Tempered safety glass is a single piece of glass that has been given a special heat treatment. It looks, feels, and weighs the same as ordinary glass. However, it can be up to five times as strong as ordinary glass. Tempered glass is used widely for glass doors in stores, for the side and rear windows of automobiles, and for other special purposes. It is hard to break even when hit with a hammer. When it does break, the whole piece of glass collapses into small, dull-edged, relatively harmless fragments.

Many different systems have been suggested in the past in order to accomplish the tempering of glass sheets and other items. Some of the glass tempering systems which have been suggested previously are discussed hereinbelow.

McMaster et al U.S. Pat. No. 3,015,910 discloses a toroidal furnace with a rotary conveyor extending through the inner wall of the furnace. The conveyor moves intermittently, while fans circulate heated air to the bottom of glass supported on a frame. The blast head has box-like jaws which close when heated glass is in position. The glass is subjected to oscillating air jets connected to a suction fan.

Nitschke et al U.S. Pat. No. 3,087,316 discloses an interrupted toroidal furnace, with a Geneva-type mechanism to index a rotary conveyor, open and close doors of individual furnace sections, and pull a blast head radially inward. The blast head oscillates when in position, and is fitted with air jets perpendicular to a curved glass surface, arranged in staggered rows of diagonally-oriented parallelograms elongated in the direction of oscillatory movement. Molds for bending the glass as it softens in the furnace have weighted members which press against the under surface of the glass.

Nitschke et al U.S. Pat. No. 3,130,032 discloses an interrupted toroidal furnace, where glass to be treated hangs vertically from tongs. A series of sliding plates cover the opening in the top of the furnace. A continually-oscillating blast head is intermittently supplied with pressurized air.

McMaster et al U.S. Pat. No. 3,249,415 relates to the use of independent conveyor systems in a linear furnace, and an overhead conveyor to return a mold and finished part to a loading and unloading station. Bending of the glass is controlled by the gas pressure supplied to a burner adjacent a bend area in the glass. The conveyors are controlled by photocells sensing that the desired bending has occurred.

McMaster U.S. Pat. No. 3,253,899 discloses the use of heat-sensitive tension tapes to separate the mold from the glass.

McMaster U.S. Pat. No. 3,281,229 relates to the use of an independent support system for a shaped ceramic bed, perforated for the passages of gases to support, heat and form glass sheets.

McMaster et al U.S. Pat. Nos. 3,332,759, 3,338,697 and 3,399,042 relates to use of shutters to control circulation in a gas support bed furnace, the use of varying patterns of perforations in the bed, and a conveyor system which cooperates with a tilted bed to frictionally engage the lowermost edge of the glass.

McMaster U.S. Pat. No. 3,353,946 discloses a blast head structure where cooling air provides a centering force to a vertically-suspended glass sheet.

McMaster et al U.S. Pat. No. 3,423,198 discloses the use of particles of materials in tempering media to vary the thermal conductivity of the media.

McMaster et al U.S. Pat. Nos. 3,455,669, 3,455,699 and 3,455,671 disclose a blast head structure for supporting a sheet of glass on the cooling air.

McMaster U.S. Pat. No. 3,485,612 relates to an inclined heating support bed, and structure for oscillating a floating glass sheet by pushing it with fingers responsive to contact with the glass sheet.

Nitschke U.S. Pat. No. 3,485,616 discloses the use of sheet members interposed between frictional drive rollers and the edges of the glass to be treated.

McMaster U.S. Pat. No. 3,488,173 relates to an apparatus for oscillating a sheet of glass supported on a gas support bed. A tilted bed and vertical-axis drive rollers contact the lowermost edge of the glass sheet, where the rotation of the rollers is controlled by a feedback control system to produce constant accelerations and decelerations. Separate structure oscillates the rollers transverse to the axis of the bed.

U.S. Pat. Nos. 3,574,588, 3,700,425, 3,723,085 and 3,607,200 disclose a loop chain fitted with pusher bars extending into the furnace to push sheets of glass into a shuttling carrier. A shuttling frame removes the glass from the carrier, raises it against a mold, and conveys it to a blast head.

McMaster U.S. Pat. No. 3,607,187 relates to a vacuum mold which is lowered to pick up a sheet of heated glass, and shape it. The glass is then either moved to a blast head, or to a frame which moves it to a blast head, where it is removed from the frame and oscillated.

McMaster et al U.S. Pat. No. 3,806,312 discloses a conveyor system including a pair of metal belts which slide on two rows of flat ceramic blocks inside the furnace and rotate rollers disposed on top of the belts and trapped between projections from the ceramic blocks.

McMaster et al U.S. Pat. No. 3,947,242 relates to a horizontal cylindrical furnace fitted with the conveyor disclosed in McMaster et al U.S. Pat. No. 3,806,312. The upper portion of each furnace section is hung from counterbalanced chains, so that it can be moved from a lower, closed, operating position, to a upper, open, non-operating position by manual actuation of an associated handle.

McMaster U.S. Pat. No. 3,994,711 discloses a furnace with separate loading, heating, quenching and unloading conveyors. The load and unload conveyor rollers are lifted from drive chains to stop the conveyors. The furnace conveyor oscillates a distance at least twice the length of the glass load, and is constructed as shown in McMaster et al U.S. Pat. No. 3,806,312 but differing in the location and material of the sliding surface for the metal drive chains.

U.S. Pat. Nos. 1,856,658, 1,856,669 and 1,879,998 disclose glass treating systems which incorporate horizontal roller conveyors. These conveyors carry sheets of glass having discrete lengths horizontally through elongated furnaces which have a decreasing temperature gradient in a direction along which the glass is conveyed. The conveyor rollers are alternately rotated in a forward and rearward rotation so that the glass is conveyed along the decreasing temperature gradient in a "two steps forward and one step backward" manner to provide thereby appropriate heat treating of the glass. Such a furnace requires a large number of reversals of the direction of roller rotation in order to provide the proper treatment of the glass.

Bornor U.S. Pat. No. 3,447,788 relates to a furnace having a horizontal roller conveyor which reciprocates a workpiece to be heated a slight amount in order to avoid the concentration of heat on the same areas of the workpiece. The purpose of this reciprocation is to ensure uniform heating of the workpiece within the furnace and to prevent sagging when the workpiece being processed is in the fluid state.

Other previous suggestions are disclosed in Drake U.S. Pat. No. 2,140,282 and Littleton U.S. Pat. No. 2,326,044.

The present invention overcomes various deficiencies and problems with respect to the previous suggestions outlined above, and also with respect to commercially-available equipment.

SUMMARY OF THE INVENTION

The present invention provides a glass tempering system including a furnace having an upper furnace section and a lower furnace section defining a horizontally elongated heating chamber. The system also includes a plurality of heating means disposed within the upper furnace section. This system also includes first frame means for supporting the upper furnace section, and second frame means for supporting the lower furnace section. A plurality of adjustable roller support means are disposed upon an upper surface of the second frame means. An endless flexible belt is supported, at least in part, by the first roller support means. A plurality of first elongated ceramic rollers are spaced along the length of the elongated heating chamber. The first elongated rollers are supported by the endless flexible belt, and extend into and through the heating chamber. The first elongated rollers are provided with non-metallic cylindrical pins frictionally retained in apertures provided in either end of the elongated rollers coaxial with the axis of the rollers. Adjustable guide members are provided with at least one elongated aperture therethrough for receiving one of the cylindrical pins retained in one of the first elongated rollers. A loading section includes third frame means connected to the second frame means. A plurality of the first adjustable roller support means are disposed on an upper surface of the third frame means. The endless belt is supported upon the first adjustable roller support means. Second elongated rollers are driven by the endless belt. The second elongated rollers are provided with ends having a pin adapted to be received through an aperture with the adjustable guide member. A quench unit includes a plurality of the adjustable roller support means for supporting a portion of the endless belt. A plurality of the second elongated rollers are driven by the endless belt. There is also provided drive means for the endless belt, including control means for causing the belt to alternately rotate the first and second elongated rollers in a first direction and then in an opposite direction, for an electronically adjustable extent of rotation, and for an adjustable speed of rotation, and to cause an extended unidirectional rotation of the first and second support rollers at an adjustable speed after a predetermined number of the alternate rotations, so that a sheet of glass placed upon the second elongated rollers in the load section will be conveyed into the heating chamber adjustably oscillated at a plurality of predetermined locations within the furnace, conveyed to and oscillated within the quench unit, and conveyed to the unload section.

It is an object of the invention to provide a glass tempering apparatus having modular furnace sections, so that the processing speed of the system may be increased by the addition of furnace section.

It is a further object of the invention to provide a roller conveyor for a glass tempering apparatus having a roller-supported drive belt to reduce friction, where the roller supports are individually adjustable to assist in presenting a planar surface to the conveyor rollers, to increase belt life, and to reduce the driving power required.

It is a further object of the invention to provide a roller conveyor for a glass tempering apparatus capable of using a non-metallic endless drive belt to drive conveyor rollers without the chance of deformation of the heated glass by a splice of a spliced metallic belt or chain passing under a conveyor roller supporting a piece of heated glass.

It is a further object of the invention to provide conveyor rollers for use in furnace sections of a glass tempering apparatus having replaceable non-metallic shaft ends, so that conveyor rollers can be retained in position by adjustable locators that can be adjusted to present new wear surfaces when required, thus eliminating roller floating and linear motion, and reducing replacement costs as well as frequency of damage due to accidental overheating which causes expansion of the pin and thus roll breakage due to the different expansion rates of the two materials.

It is a further object of the invention to provide a glass tempering apparatus having conveyor roller and drive belt support systems, adjustable around a central axis to produce a horizontal and level conveyor surface.

It is a further object of the invention to provide a heat treating apparatus having conveyor drive belts made of soft heat-resistant fabric covered with Teflon or silicone rubber to reduce wear on the ends of conveyor rollers, increase the efficiency of transmission forces, and reduce vibration transferred from the drive system to the glass being treated. The 1000 to 1 restriction stated in the aforementioned McMaster et al U.S. Pat. No. 3,806,312, column 6, line 63, does not apply to the present invention. Much smaller diameter drive sheaves and take-up sheaves may thus be used with the present invention while also attaining sufficient traction.

It is a further object of the invention to provide a conveyor roller for use in a furnace section of a glass tempering apparatus having ends covered by a sleeve to protect the rollers, increase efficiency of power transmission, and further reduce vibration transferred from the drive system to the glass being treated.

It is a further object of the invention to provide a reciprocating mechanism for decreasing furnace length required, and for causing reciprocation of substantially less than the length of the glass being treated, thereby reducing size and cost of furnace sections, and reducing the time a conveyor roller is not transferring heat to glass being treated, so that individual rollers do not overheat and a greater percentage of the heated section is being used continuously. This latter feature also enhances the entire already-efficient system.

It is a further object of the invention to provide a reciprocating mechanism to allow adjustment of the length of reciprocating motion so that the glass being treated may be made to contact substantially all of the conveyor rollers in a furnace section during reciprocation.

It is a further object of the invention to provide a glass tempering apparatus having conveyor rollers in non-heated sections which resiliently support glass being treated, reducing thermal contact area between hot glass and cold conveyor rollers, as well as reducing breakage during loading and unloading.

BRIEF DESCRIPTION OF THE DRAWINGS

FIG. 4a is another sectional view of a roller assembly similar to that shown in FIG. 4 and viewed along the same angle as FIG. 4.

FIG. 8 is a side elevational view of a roller shoe according to a first embodiment of the invention.

FIG. 9 is a view of the roller shoe taken along line 9—9 of FIG. 8.

FIG. 10 is a side elevational view of a roller support assembly according to a first embodiment of the invention, for use in unheated sections of the glass tempering system.

FIG. 11 is a view of the roller support assembly taken along line 11—11 of FIG. 10.

FIG. 12 is a perspective view of an end plug for a roller according to a first embodiment of the invention.

FIG. 13 is an end elevational view of the end plug shown in FIG. 12.

FIG. 14 is a detail side elevational view showing a rubber washer installed on a roller according to a first embodiment of the invention.

FIG. 15 is an end elevational view, partly in section, of the installed rubber washer and roller of FIG. 14.

DETAILED DESCRIPTION OF SOME PREFERRED EMBODIMENTS

Figure 1:
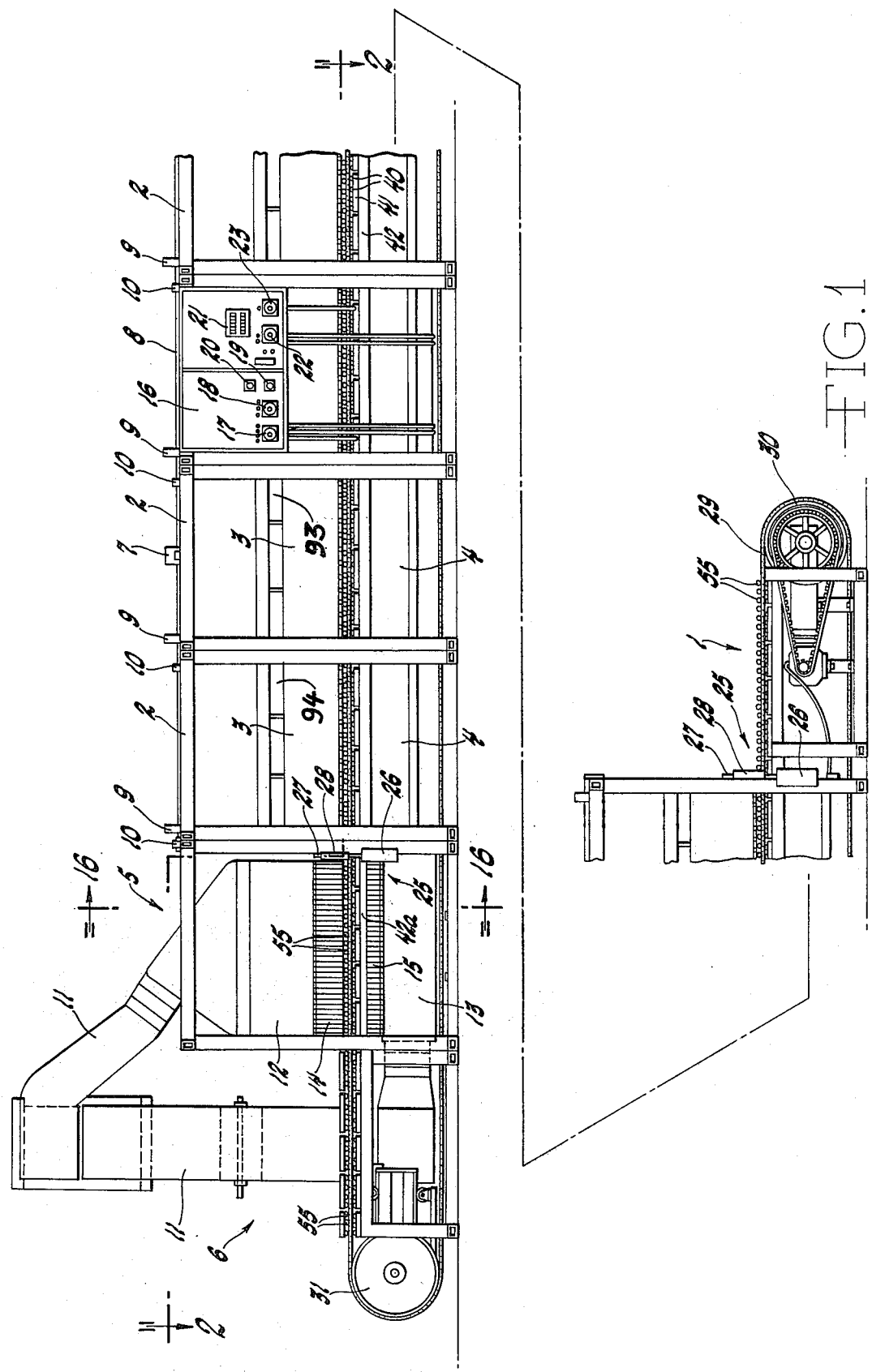
FIG. 1 is a side elevational view of a glass tempering system according to a first embodiment of the invention.

FIG. 1 illustrates a glass tempering system incorporating novel features according to a first embodiment of the invention. The system comprises a load section 1, modular furnace frames 2, upper and lower furnace sections 3 and 4, respectively, a quench section 5, and an unload section 6.

Figure 18:
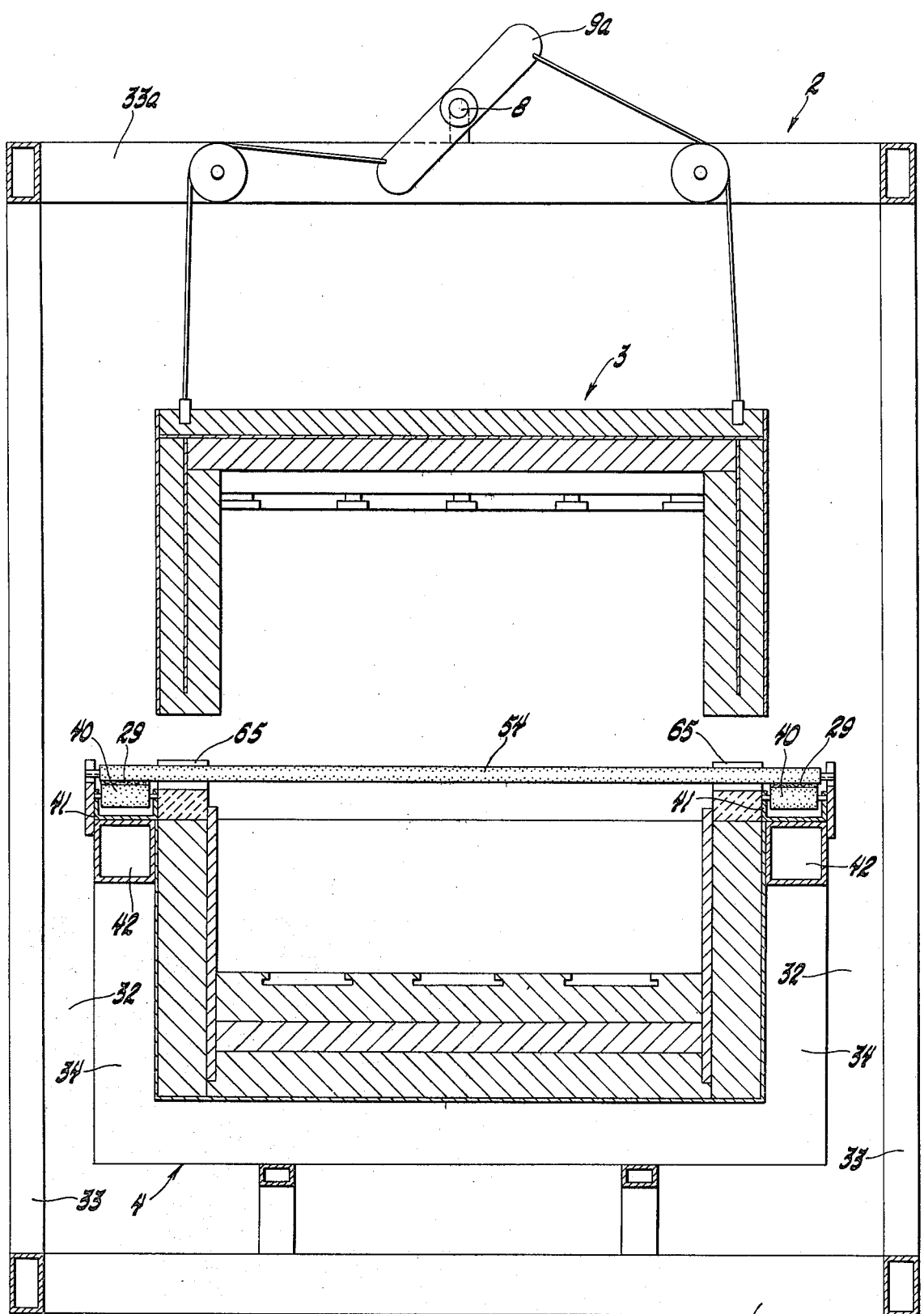
FIG. 18 is a sectional view of a first embodiment of a furnace section according to the invention, wherein the entire furnace upper section is raised for access to the heating chamber.

Actuator 7 rotates rod 8, supported by pillow blocks 10, to rotate arm 9a (FIG. 18) or chain wheel 9b (FIGS. 19, 20 and 23), and to lift upper furnace sections 3 to provide access to the interior of the furnace. In this regard, the main reason for lifting upper furnace sections 3 is to allow glass, which has been broken during heating due to an inherent defect, to be pushed out of the furnace. Another reason for gaining access to the interior of a conventional glass tempering furnace is to remove glass (which is electrically conductive when molten) from uncovered electrical heaters, or to remove it from steel plates protecting the electrical heaters. This problem is eliminated, or at least greatly alleviated, by the instant invention, as will appear below.

Actuator 7 may, for example, be a conventional pneumatic cylinder actuated in a conventional manner, an electric motor coupled to a conventional rotary-to-linear motion converting device, such as a pulley and wire rope, or a gear and rack, or the like for driving shaft 8 directly. Alternatively, actuator 7 may be a simple counterbalancing spring, depending on the requirements for an individual glass tempering system.

Air ducts 11 convey air from a blower (not shown) to upper and lower plenum chambers 12 and 13, from where the air is ejected through quench jet assemblies 14 and 15.

Control panel 16 includes a D.C. motor drive package (not shown) of conventional design, such as produced by Polyspede Electronics Corp. of Dallas, Tex., as Model Number PRD 8-300 Regenerative Drive System, various temperature controllers, timers, and an up-down presettable counter.

In the embodiment illustrated in FIG. 1, temperature controller 17 controls the temperature produced by electrical heaters 93 in a first upper furnace zone, not necessarily corresponding to a single furnace section 3. Temperature controller 18, in like manner, controls the temperature in a first lower furnace zone, while temperature controllers 22 and 23 provide control for heaters 94 in upper and lower sections of a second furnace zone.

Timers 19 and 20 are used in conjunction with an up-down presettable counter 21 to determine the time a piece of glass will spend in an area of the furnace.

Counter 21, which may be of the type manufactured by Electronic Counters & Controls, Inc. of Mundelein, Ill., having two banks of thumbwheel switches, to select digitally the length of a feed or transfer cycle, and to select the desired length of an oscillating cycle. The active bank of counter 21 is selected by a timer 19 or 20, and the counter 21 receives a representation of position from encoder 24, best shown in FIG. 2. The use of such devices to provide substantially infinitely-variable positioning and oscillating of pieces of glass is believed to be novel in itself, since it allows an empirical determination of the process parameters that will produce best results in a given task.

At both ends of the furnace sections of the illustrated machine, gates 25 are provided. The purpose of gates 25 is to shield the gaps through which the sheet glass passes in and out of the furnace from random drafts of cool air which can disturb internal temperatures and cause uncontrollable quenching, and breakage. Each gate 25 includes a pair of pneumatic cylinders 26, activated in synchronism with glass movement to push gate boards 27 upwardly in guides 28. The provision of such gates 25 is also believed to be novel. These gates 25 enhance greatly the possibility of open side apertures without loss of inner furnace heat. Air pressures originating at either end of the furnace and consequently being forced out of such apertures would cause extensive overheating of the drive belts and related components.

Figure 2:
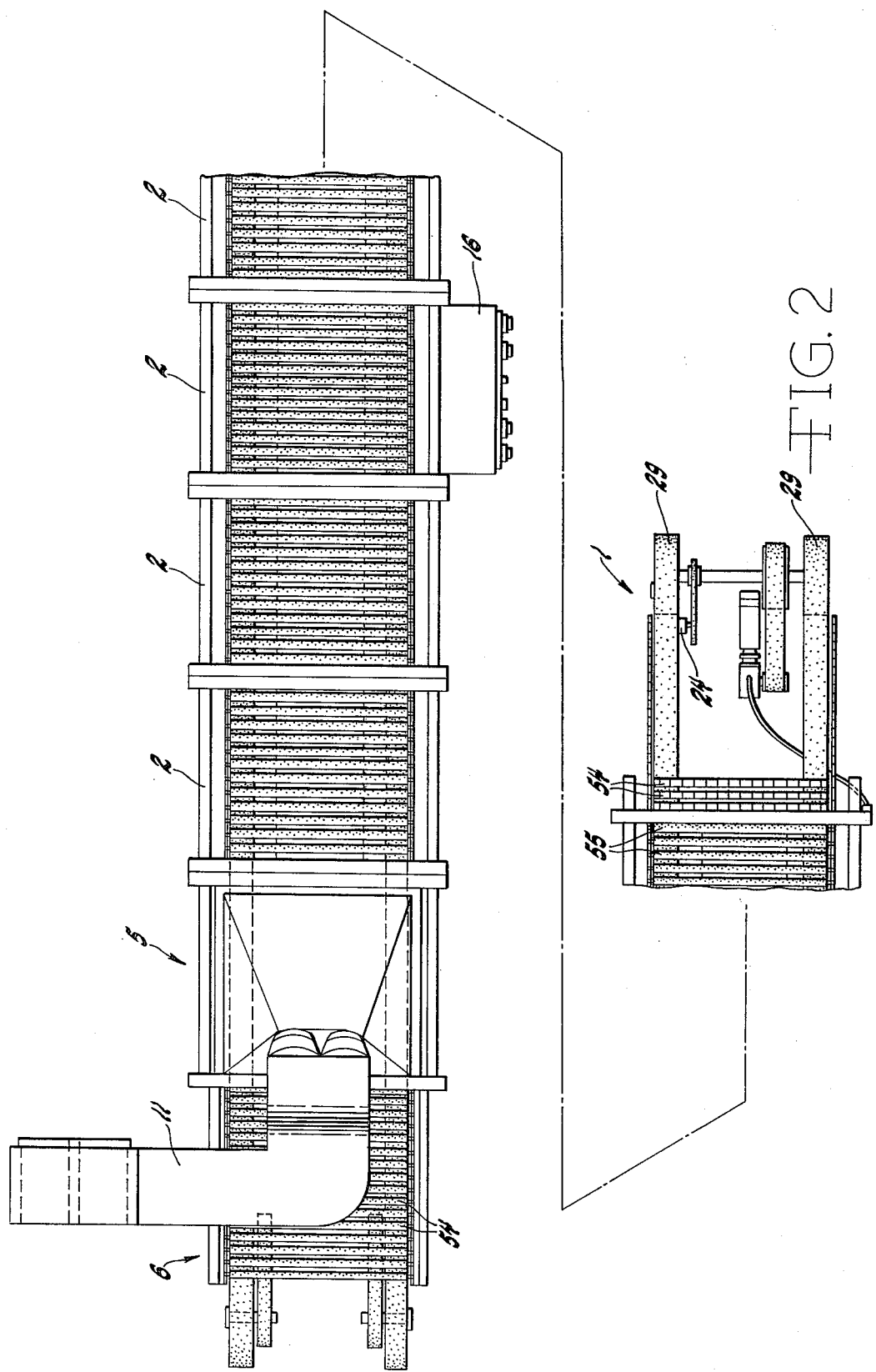
FIG. 2 is a top elevational view, partially in section, of the system taken along line 2—2 of FIG. 1.
Figure 3:
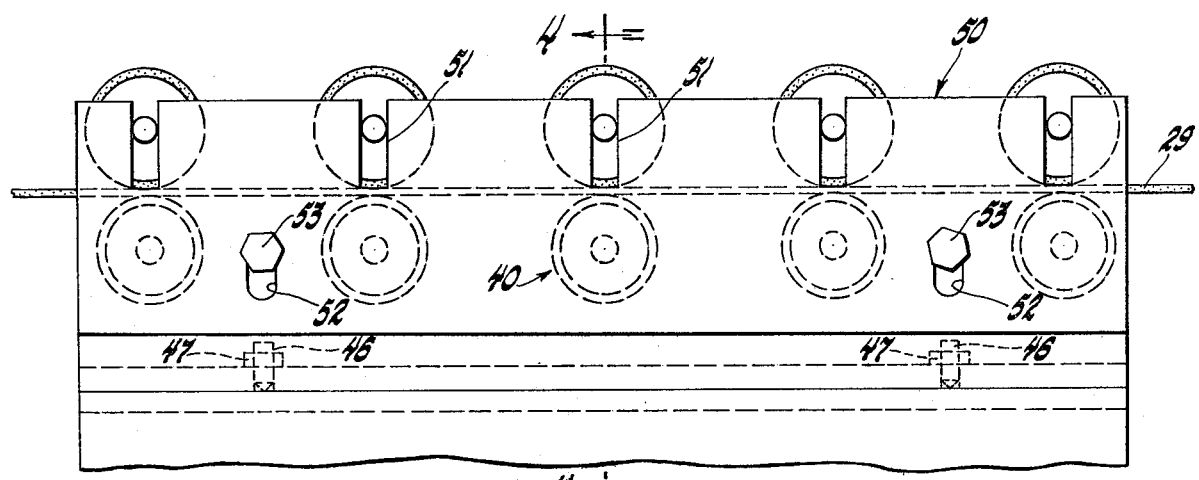
FIG. 3 is a side elevational view of a roller support assembly according to a first embodiment of the invention.
Figure 4:
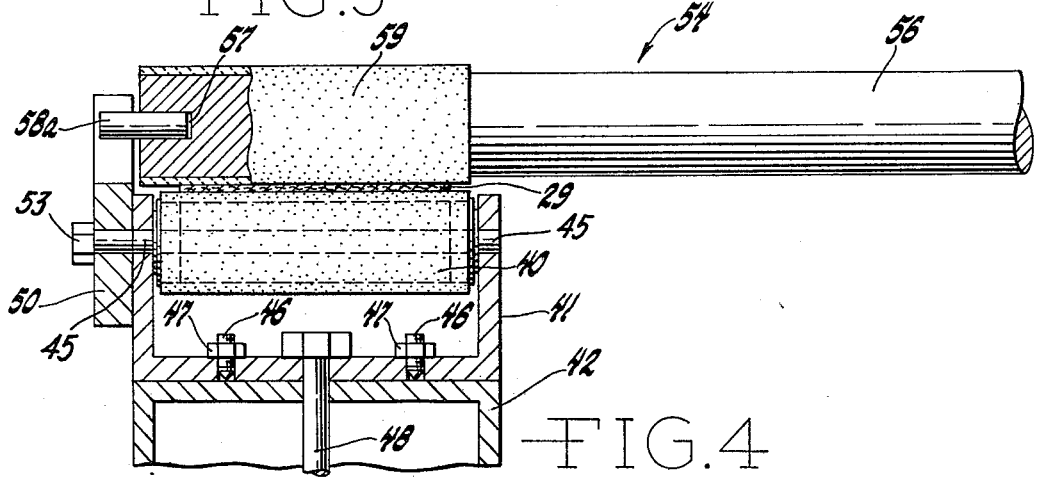
FIG. 4 is a sectional view of a roller support assembly taken along line 4—4 in FIG. 3.

As shown in FIGS. 1 and 2, a pair of endless belts 29 extend the length of the machine, between drive wheels 30 and tension idler wheels 31. The novel construction of the machine, as better shown in FIGS. 16–20 and 23, creates a space 32 between top support frame section 33 and lower support frame section 34 through which an endless belt 29 may be installed over wheels 30 and 31.

In conventional machines, a metal belt is first placed on the machine, and then spliced while in place. Once the metal belt is installed, the welded splice cannot be completely smoothed, so that the belt, which indirectly supports glass being treated, will intermittently cause distortion in glass being treated. This renders one of thirty to forty pieces of glass being treated optically defective.

With the present invention, a belt 29 can be assembled off the machine, and a perfect splice can be produced.

Another cause of optical distortion in glass softened by heating in a tempering oven is vibration from the external environment and from the operation of the machine itself. In a preferred embodiment, the belts 29 are part of the solution to the problem. A spliceless, woven polyester loop is coated with silicone rubber and installed as the belt 29. The resilience and damping of the cloth and rubber serve as vibration insulators. A suitable belt material is available from Globe Albany Corp. of Buffalo, N.Y., as style IWP-3 Untreated Silicone COS.

Belts of conventional machines are slidably supported on flat surfaces. This is also a source of possible vibration from stick-slip friction, as well as presenting difficult alignment problems in providing a truly flat surface. These problems are also greatly alleviated by the present invention. Belts 29 are supported on antifriction rollers 40 (FIGS. 1, 3–11, 18–23), mounted in adjustable roller supports 41 extending over the length of the machine, adjustably secured to frame members 42 and 42a. Belts 29 act only as a driving means, and should not be confused with a support system, such as disclosed by the aforementioned McMaster et al U.S. Pat. No. 3,806,312, column 1, line 62–column 2, line 15. Frame members 42a (FIGS. 1, 16) are narrow to reduce air restriction.

Figure 5:
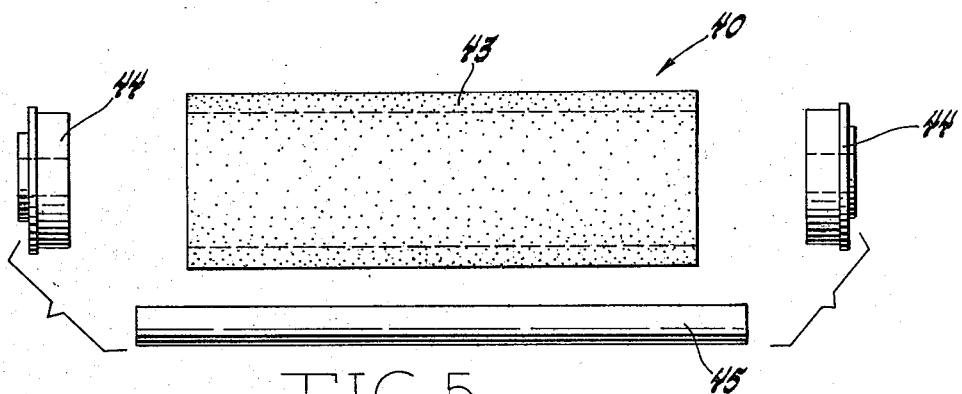
FIG. 5 is a disassembled view of a belt support roller according to a first embodiment of the invention.
Figure 6:
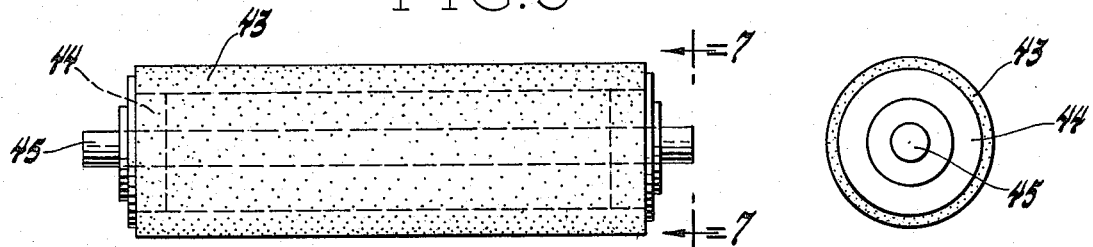
FIG. 6 is an assembled view of the FIG. 5 belt support roller.
Figure 7:
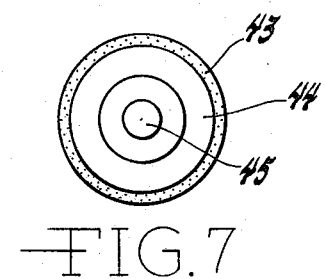
FIG. 7 is a view of a belt support roller taken along line 7—7 of FIG. 6.

As shown in FIGS. 5, 6, and 7, each support roller 40 is made from a tube 43, two bearing caps 44 and rod 45. Roller supports 41 are adjustable by means of set screws 46, which bear against member 42. After the desired orientation of support 41 is attained by adjusting set screws 46, the set screws 46 are secured by lock nuts 47. The supports 41 are secured by bolts 48 into member 42.

After supports 41 are suitably adjusted to provide a truly flat supporting surface, belt 29 is installed, and is supported on rollers 40.

Conveyor rollers 54 and 55 to support the glass to be treated are then placed upon the belts 29, and restrained from lateral motion by adjustable roller guides 50, as shown in FIGS. 3, 4, 10 and 11. As shown, guides 50 have slots 51 to hold the rollers, and slots 52 cooperating with bolts 53 to allow adjustment of guides 50. As slots 51 wear, the guides 50 may then be adjusted to present non-worn surfaces to the rollers.

There are at least two basic types of conveyor rollers according to the present invention. There are high-temperature ceramic rollers 54 and low temperature rollers 55. Although rollers 54 could be used throughout the machine, in the preferred embodiments rollers 54 are used only between furnace sections 3 and 4, and rollers 55 are used in load section 1, quench section 5 and unload section 6.

Roller 54 is composed of ceramic shaft 56, having a recess 57 at either end to frictionally retain pins 58a. In a preferred embodiment, pins 58a are made of a rigid non-metallic material, such as Teflon or silicon having a high degree of slipperiness. This provides several advantages. Pins 58a can be easily replaced when worn, and do not tend to break the shafts 56 should overheating and differential expansion occur. The provision of the renewable pin 58a, in conjunction with guide 50, is believed to be novel, and substantially eliminates roller float, or lateral movement, and cocking, which are additional sources of vibration which can distort or scuff softened glass. In the embodiment shown in FIG. 4, ceramic shaft 56 carries a resilient sleeve 59 at each of its ends. Sleeve 59 extends the width of belt 29. The purpose for sleeve 59 is to further reduce vibration. In the embodiment shown in FIG. 4a, ceramic shaft 56 is turned down at either end so that the resilient sleeve 59 may be provided flush with the exterior of shaft 56. As shown, sleeve 59 does not interfere with removal of broken glass by simply pushing it across rollers 55 and out the opposite side of the machine.

The construction of low-temperature rollers 55 is shown in FIGS. 11-15. Tubular members 60 are provided at both ends thereof with ends caps 61 which have pins 58b retainable in slots 51 of guides 50. Each member 60 is provided with a plurality of square-bottom grooves 63, which retain cylindrical rubber washers 62. Grooves 63, and washers 62 are closely spaced at both ends of member 60, and are spaced apart over the remainder of members 60 in two different patterns so that washers 62 may be staggered on intermediate portions of adjacent rollers 55.

FIGS. 8 and 9 illustrate roller shoes 65 according to the present invention. As will be apparent from FIGS. 18-20 and 23, roller shoes 65 rest upon an upper surface of lower furnace sections 4, and support a lower surface of upper furnace sections 3, and also serve as insulation to reduce heat losses where rollers 54 enter the heating chamber of the furnace.

Figure 16:
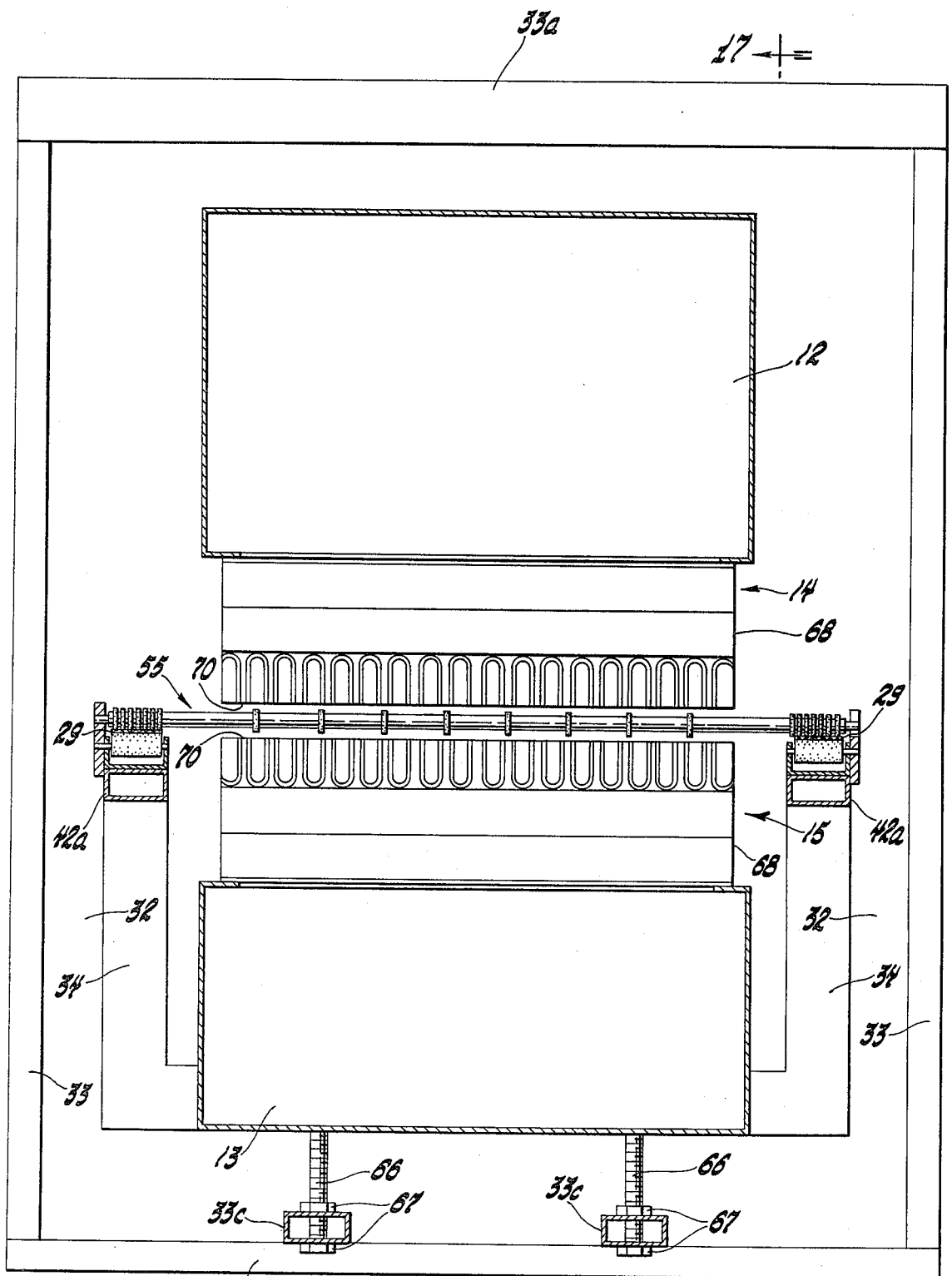
FIG. 16 is a sectional view of the quenching unit according to a first embodiment of the invention taken along line 16—16 of FIG. 1.
Figure 17:
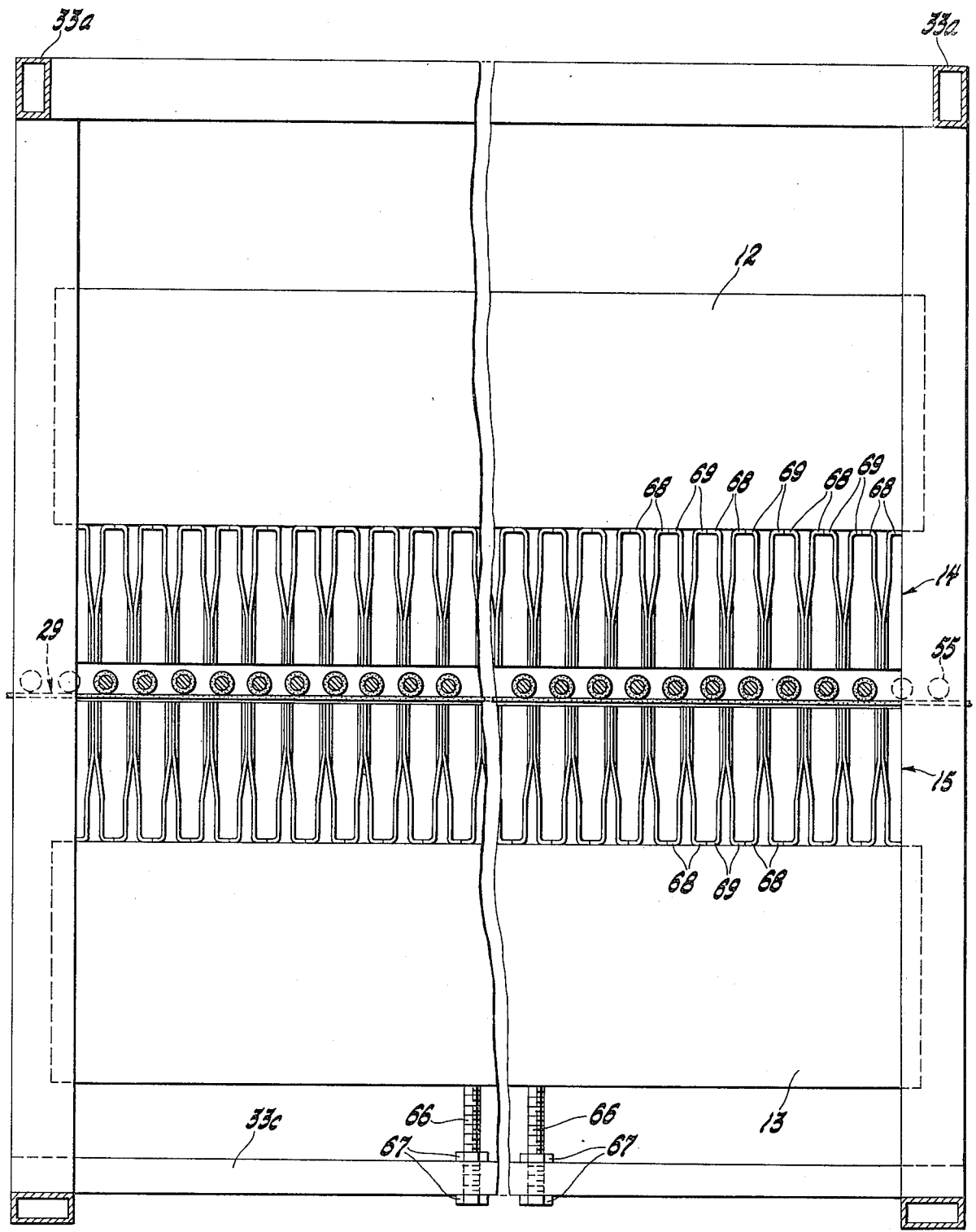
FIG. 17 is a sectional elevational view of the quenching unit taken along line 17—17 of FIG. 16.

FIGS. 16 and 17 illustrate a quenching unit according to the present invention. Side upper frame members 33 and top and bottom members 33a and 33b support upper and lower plenums chambers 12 and 13. In the section illustrated, plenum chamber 13 is adjustable supported by threaded bolts 66, retained in position by nuts 67 on both sides of rails 33c attached to frame member 33b. Although not shown in the view illustrated, the upper plenum chamber 12 is supported from member 33a in a similar manner. This allows easy adjustment of the distances from quench jet assemblies 14 and 15 to a sheet of glass supported on rollers 55, to allow for varying the force and spreading of cool air to achieve optimum quenching rates. Quench jet assemblies 14 and 15 may, for example, be made by welding complementary stampings 68 and 69 together, and filling in the open ends with matching plates welded in place, as in Flynn U.S. Pat. No. 3,499,720. As is known, the upper and lower quench jets should, preferably, directly oppose each other, to provide balanced vertical forces. The jets in adjacent rows, should, preferably, be staggered to provide even distribution of cool air. In the illustrated embodiment of the invention, this function is therefore easily and inexpensively accomplished, with only two different parts repetitively assembled to form a plurality of jets 70 from each pair of stampings 68 or 69.

Figure 21:
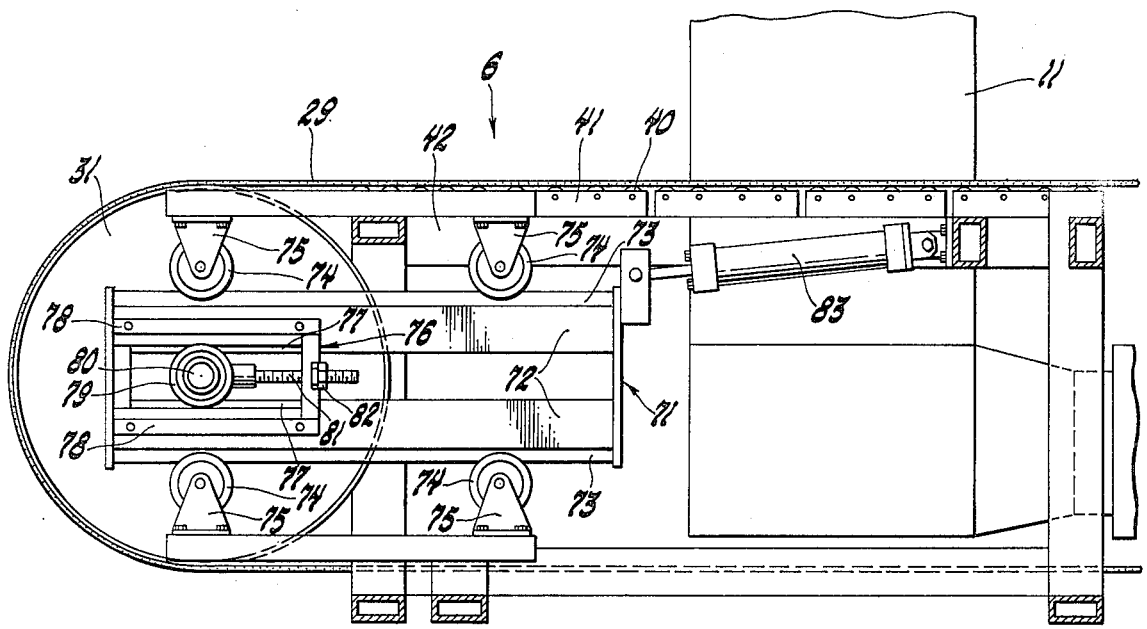
FIG. 21 is a side elevational view, partially in section, of an unloading section of a system according to a first embodiment of the invention.
Figure 22:
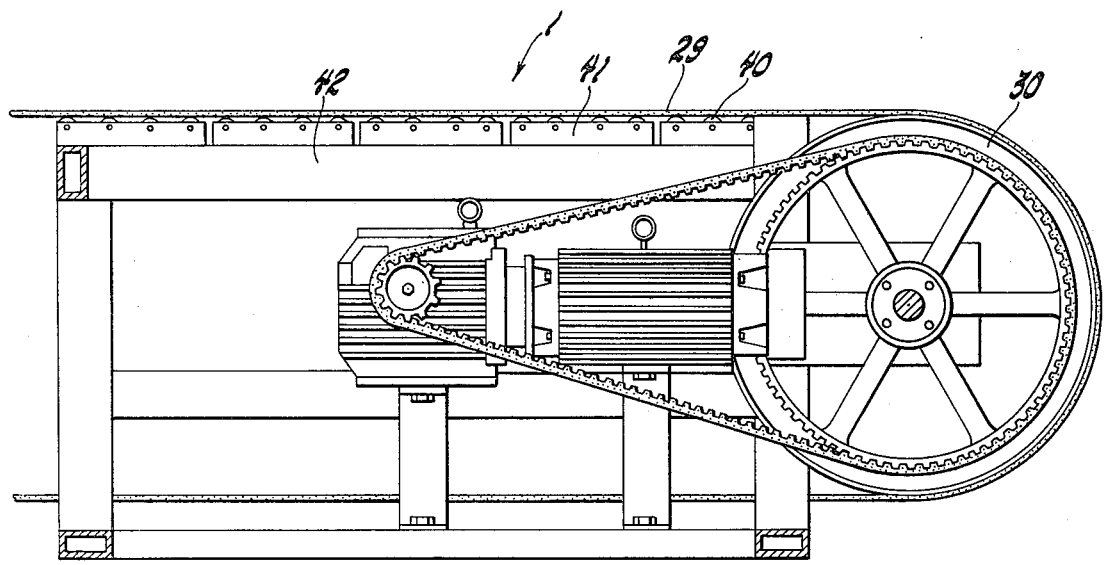
FIG. 22 is a side elevational view, partially in section, of a loading section of a system according to a first embodiment of the invention.

FIGS. 21 and 22 illustrate details of the load and unload sections of the illustrated embodiments of the invention. In FIG. 21, the belt tensioning assembly at unload section 6 is shown. On both sides of the illustrated machine, a frame 71 includes a pair of members 72 having V-shaped edges 73 that mate with V-shaped grooves in rollers 74, which are mounted in brackets 75. Brackets 75 are, in turn, fixedly mounted to appropriate parts of the frame of the illustrated embodiment.

Frame 71 carries an adjusting frame 76, having V-shaped edges 77 on members 78. Guide roller 79, having mating V-shaped grooves, is rotatably mounted to a shaft 80 of wheel 31, and secured by threaded rod 81. Threaded rod 81, together with nuts 82, positions shaft 80 within frame 71 and guide frame 76, and form a convenient mechanism for compensating for stretching of the belt 29. The tension of a belt 29 may be maintained by pneumatic cylinder 83 pressing upon frame 71, as shown, or, by other suitable means.

Figure 19:
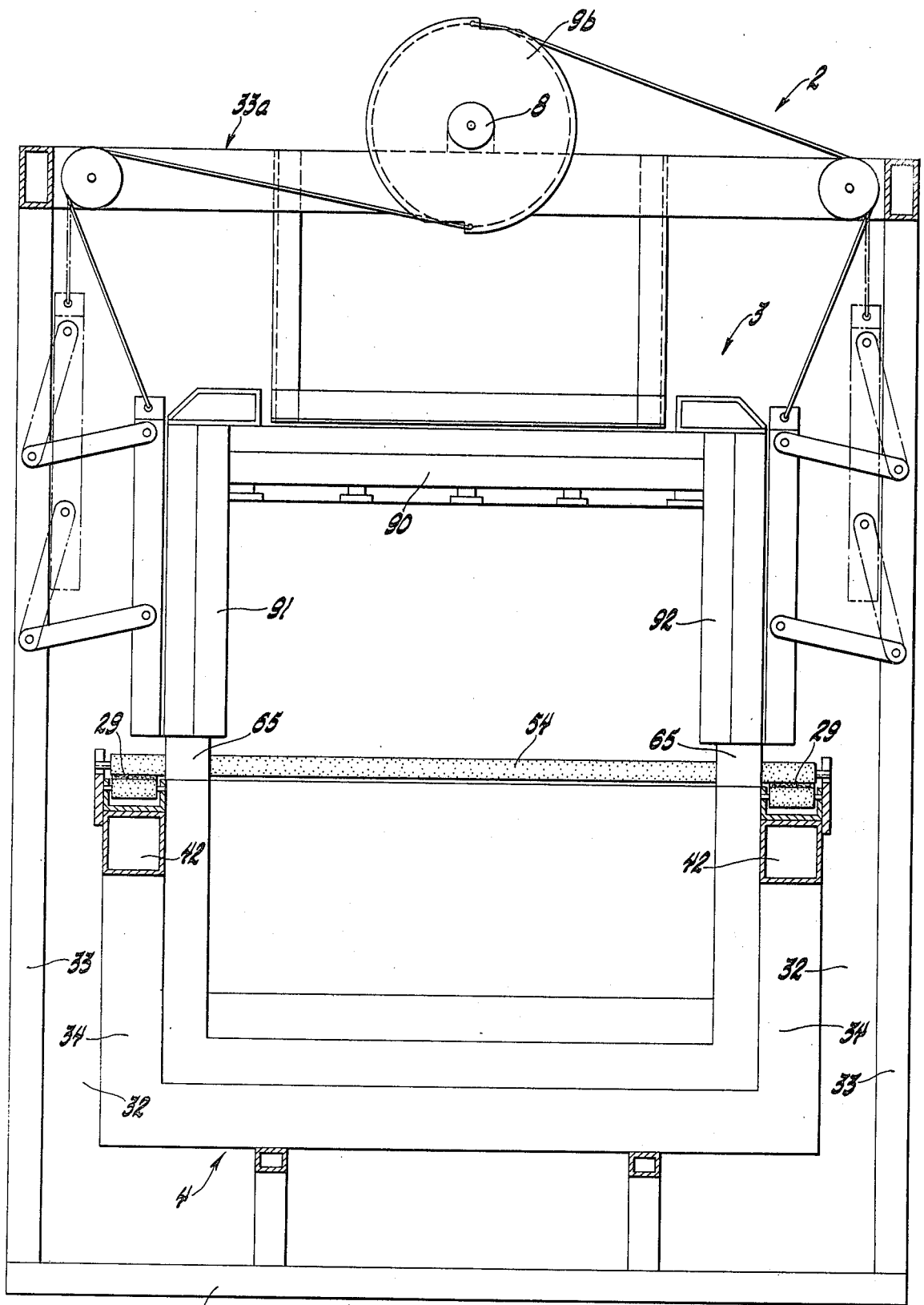
FIG. 19 is a sectional view of a second embodiment of a furnace section according to the invention, wherein the top portion of a furnace upper section is fixed in position, and side wall portions are movable to gain access to the heating chamber.

FIG. 19 shows a second embodiment of the furnace section wherein the top portion 90 of a furnace upper section 3 is fixed or stationary in position, and wherein the side wall portions 91 and 92 are movable to gain access to the heating chamber.

Figure 20:
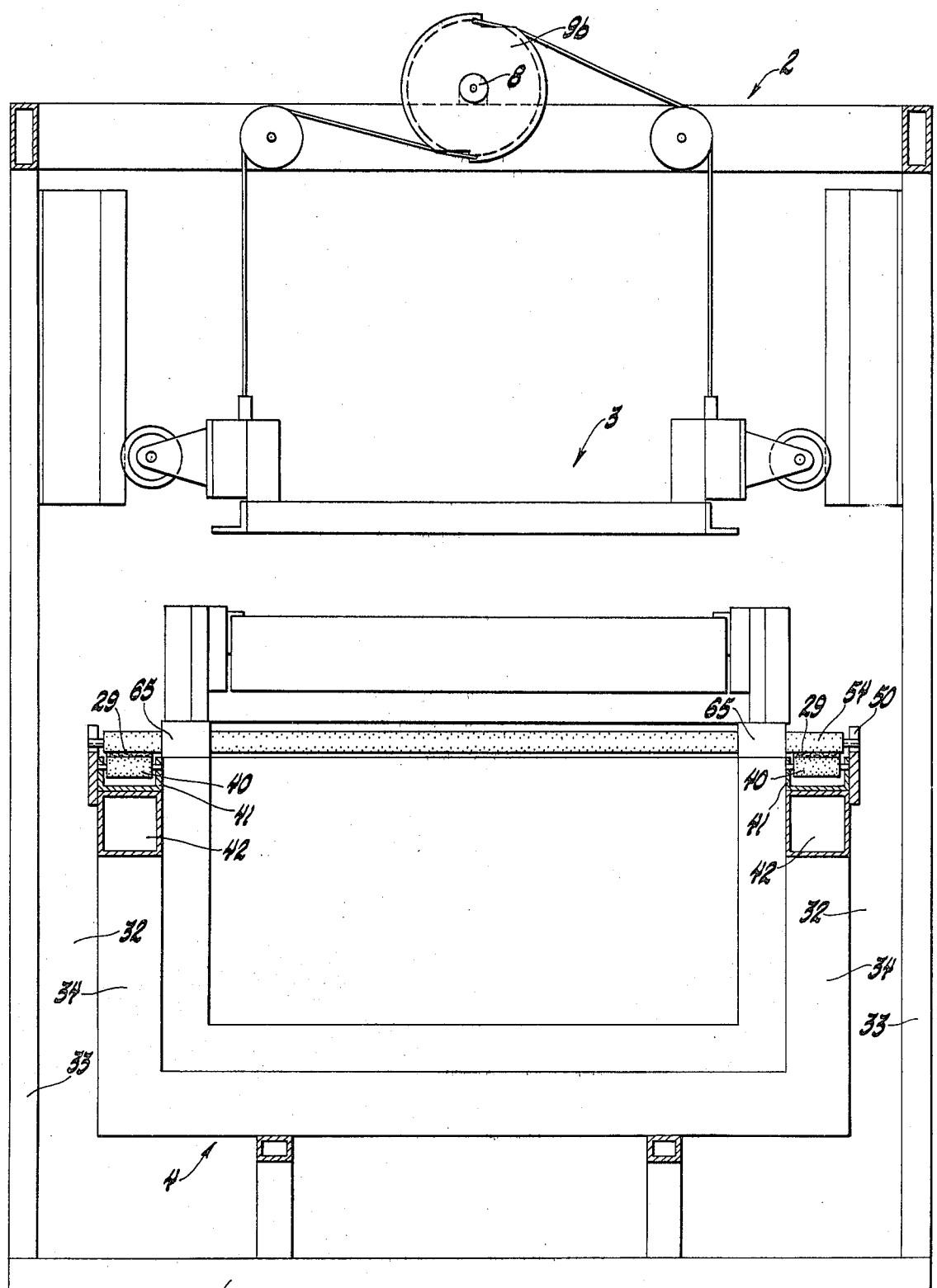
FIG. 20 is a sectional view of a third embodiment of a furnace section according to the invention, showing guide means for a movable furnace upper section.

FIG. 20 illustrates a second embodiment of a furnace section, with particular emphasis on guide means for moving en masse the entire furnace upper section 3 by the use of a chain wheel 9b.

Figure 23:
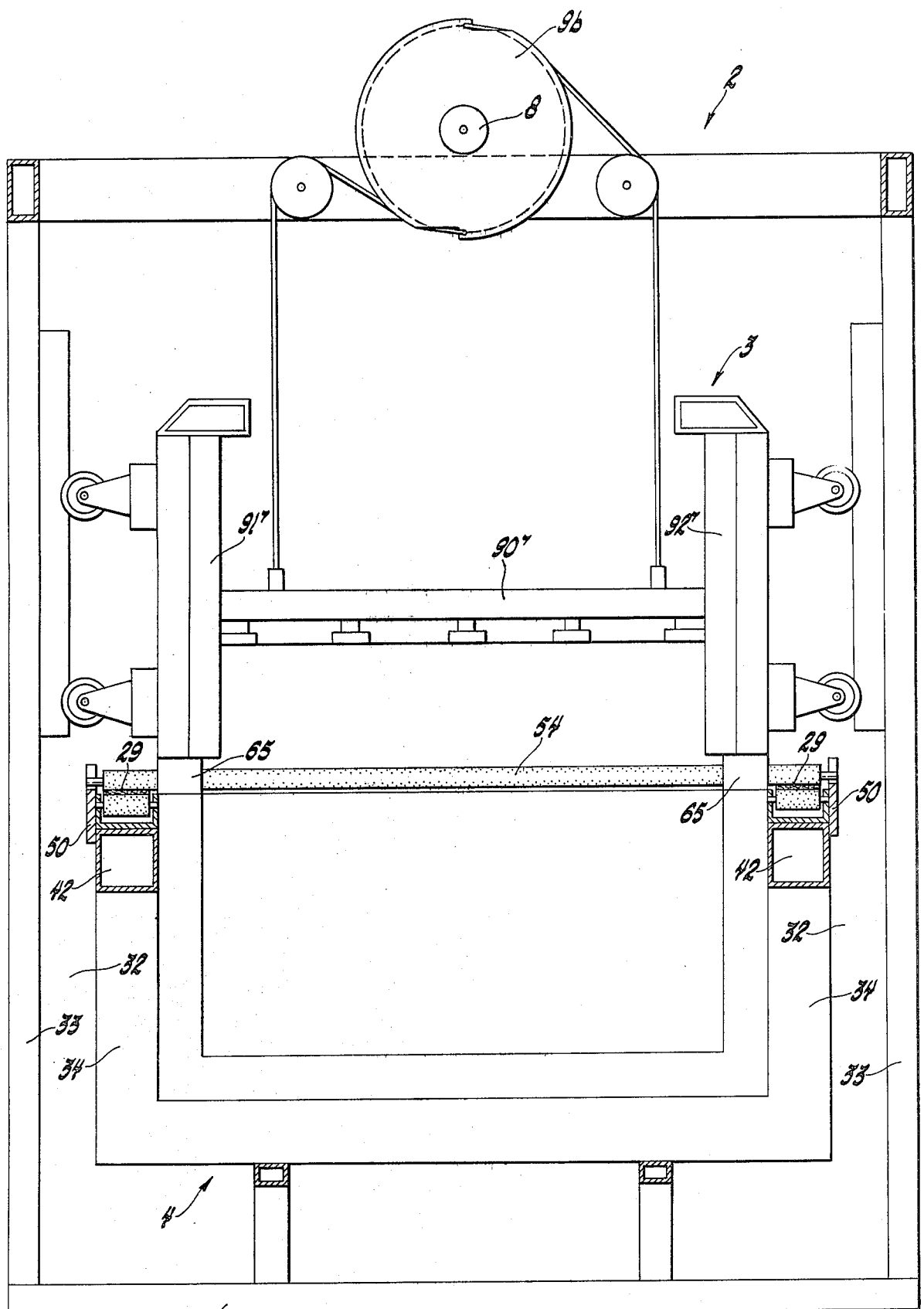
FIG. 23 is a sectional view of a fourth embodiment of a furnace upper section according to the invention, wherein the upper portion and the sidewall portions are independently movable to allow variable spacing between the heating means and the glass being treated.

FIG. 23 illustrates a fourth embodiment of the furnace upper section 3, wherein the top portion 90' and the side wall portions 91' and 92' are independently movable to allow variable spacing between the heating means and the glass being treated.

One aspect of the present invention resides in the roller track supporting the conveyor drive belts. This feature substantially lessens the friction that is otherwise encountered with slider type belt systems, and thus increases belt life and reduces the power necessary to move the same. In the present invention it should be noted that the rollers are beneath the conveyor drive belts.

Another aspect of the invention relates to the locators or guides required for conveyor roller spacing which are adjustable to provide a new wear surface when necessary. This eliminates roller float or linear motion.

Another aspect of the invention resides in the fact that the heating zone sizes more closely approximate the piece of the glass being treated. This is an important difference with respect to the prior suggestions due to the fact that in the present invention the glass is reciprocated five inches or less in either direction during heating and cooling. In other systems, the glass being treated moves at least the length of the part being treated.

Another aspect of the invention resides in the provisions for adjusting the length traveled during the reciprocating period to correspond with the length of the glass product. This reduces overheating of the product ends by limiting contact with the hot conveyor rollers. With the present invention, it is possible to change the distance the glass product moves back and forth in the oven. The prior suggested systems cannot accomplish.

The invention also provides fully adjustable roller and drive belt support systems, around a central axis, for controlling the horizontal plane of the track and thus maintaining a more level conveyor bed. The bed level is very critical to produce a quality product.

The invention also provides a furnace construction which permits the use of endless conveyor belts that eliminate the need for on sight splices or segmented systems. Splices and/or segmentation causes the bed roll to be raised whenever it passes over any roll area. This raising or lifting is transferred to the product if it happens to be at the roll in question, and it is in the pliable stage of the product being treated. This would result in an inferior or warped end product.

The invention also provides unitized zone construction, allowing for future increase in product output, simply by installation of one or more heating zones and lengthening of drive belts. No other alterations are necessary to expand the system.

Another aspect of the invention resides in the use of a wear-resistant, disposable, Teflon and/or silicone axle, in lieu of a normally steel, non-removable axle used by conventional systems. This reduces the cost of replacement of ceramic rolls due to pin wear.

Another aspect of the invention is the incorporation of a soft, heat-resistant fabric, which is coated with Teflon and/or silicone rubber. This reduces wear on journal ends of the ceramic rollers. This also increases driving forces transmitted to the conveyor rolls; eliminates the need for large diameter sheaves (such as the 1000 to 1 conventional sheave diameter to belt thickness ratio); does not require additional heat to keep belt tracking straight; does not require the use of an abrasive device to grind down dimples in a belt surface; and does not require lubrication.

Various modifications and changes in the preferred embodiments subscribed hereinabove will occur to the artisan. The present invention embraces all such modifications and changes, and should only be limited within the scope of the appended claims.

I claim:

1. A conveyor for a glass-tempering system having a supporting frame section, comprising:
   a first elongated glass-supporting conveyor roller;
   an upwardly-open roller support;
   means mounting said roller support on a frame section;
   a second roller rotatably mounted in said roller support with its axis parallel to that of said glass-supporting conveyor roller;
   a driving belt extending between said first and second rollers within said roller support and operable to rotate said conveyor roller;
   said second roller supporting said driving belt, with said driving belt vertically supporting said first conveyor roller above said second roller;
   a roller guide supported upon said roller support;
   a vertically-extending upwardly-open guide slot in said roller guide extending in the same vertical plane as the axis of said second roller and being directly above said axis;
   said conveyor roller having a projecting axle-like pin received in said guide slot and freely movable vertically therein but restrained horizontally thereby, with said axle-like pin of said conveyor roller being in the same vertical plane as the axle of said second roller;
   said roller guide having a portion defining a bottom for said slot;
   said second roller being mounted beneath said conveyor roller at a distance with respect to the bottom of said guide slot such that said conveyor roller axle-like pin is maintained above and out of contact with said bottom of said slot;
   said conveyor roller being removable by lifting upwardly out of said guide slot whereupon said belt can be removed from said second roller and through said upwardly open roller support; and
   drive means for driving said belt.

2. The conveyor of claim 1, wherein:
   there is means for vertically adjusting said roller support with respect to said frame section and for locking said roller support in a selected adjusted position.

3. The conveyor of claim 1, wherein:
   said roller guide is adjustably mounted on said roller support for movement of said guide and said slot vertically with respect to said conveyor roller axle-like pin to change the contact area between said pin and said slot.

4. The conveyor of claim 1, wherein:
   said belt extends between said conveyor roller and said second roller then lengthwise through at least a portion of said frame section, then downwardly over belt supporting means on said frame section, then beneath said supporting frame section, and said belt constitutes an endless preformed member insertable into and removable from said furnace upon vertical removal of said conveyor roller from above said second roller.

5. The conveyor of claim 1, wherein:
   said frame section comprises an upper and a lower frame section with both of said rollers and said belt being supported on said lower section, and the lower section is mounted within a supporting frame for the upper section but is spaced vertically and horizontally therefrom sufficiently to enable insertion and removal of said belt in endless form.

6. The conveyor of claim 1, including:
   a belt tensioning means on said frame section for facilitating insertion and removal of said belt, and for tensioning said belt to effect the desired drive relationship with said drive means and said rollers.

7. The conveyor of claim 1, wherein:
   said pin has a high degree of "slipperiness".

8. The conveyor of claim 1, wherein:
   said second roller has an antifriction surface which engages said belt.

9. The glass-tempering system according to claim 1, wherein:
   said supporting roller is provided with a resilient sleeve interposed between said conveyor roller and said belt.

10. The glass-tempering system of claim 9, wherein:
    said sleeve is flush with the surface of said conveyor roller.

11. The glass-tempering system according to claim 1, wherein:
    said frame section comprises an upper furnace section and a lower furnace section;
    heating means in said upper furnace section;
    a second elongated conveyor roller having an axle-like pin; and
    control means for causing said belt to alternately rotate the first mentioned conveyor roller and said second conveyor roller in a first direction and then in an opposite direction to effect oscillation thereof and of a sheet of glass supported thereon.

12. A glass-tempering system according to claim 11, wherein:
    said pin of the first mentioned said elongated roller is fabricated from non-metallic material.

13. A glass tempering system according to claim 11, wherein:

the length of said oscillation of said glass is substantially less than the length of said glass sheet.

14. A glass tempering system according to claim 11, wherein:
the length of said oscillation of said glass is substantially equal to the diameter of said roller.

15. A glass tempering system according to claim 11, wherein:
wherein each said second elongated roller includes a hollow tube, a plurality of flat-bottomed circumferential grooves, and cylindrical elastomeric washers retained in said grooves.

16. A glass tempering system according to claim 11, wherein:
said lower furnace section is provided with second heating means disposed therewithin; and
said second heating means are fewer in number and lower in output than the heating means disposed within said upper furnace section.

17. A glass tempering system according to claim 11, including:
gate means disposed adjacent both ends of said furnace for substantially reducing a flow of air into said furnace; and
said gate means being automatically raised during said extended unidirectional rotation of said support rollers so that sheets of glass may be conveyed into and out of said furnace.

18. A glass tempering system according to any one of claims 11, 13, 14, 15, 12, 16 or 17, wherein:
said endless belt is fabricated from non-metallic material.

19. A glass tempering system according to any one of claims 11, 13, 14, 15, 12, 16 or 17, wherein:
said endless belt comprises a wooven heat-resistant fabric which is coated with a heat-resistant elastomeric material.

20. A glass tempering system according to any one of claims 13, 14, 15, 12, 16 or 11, wherein:
said control means causes said endless belt to alternately rotate said first and second elongated rollers in a first direction and then in an opposite direction for an electronically adjustable extent of rotation and for an adjustable speed of rotation, and causes an extended unidirectional rotation of said first and second support rollers at an adjustable speed after a predetermined number of said alternate rotations.

* * * * *